US010712804B2

(12) United States Patent
Singh et al.

(10) Patent No.: US 10,712,804 B2
(45) Date of Patent: Jul. 14, 2020

(54) DYNAMIC SELECTION OF DISPLAY RESOLUTION

(71) Applicant: Intel Corporation, Santa Clara, CA (US)

(72) Inventors: Arun Kumar Singh, Bangalore (IN); Qixiong Bian, Beaverton, OR (US); Vishwanath Somayaji, Haralur Bangalore (IN)

(73) Assignee: Intel Corporation, Santa Clara, CA (US)

( * ) Notice: Subject to any disclaimer, the term of this patent is extended or adjusted under 35 U.S.C. 154(b) by 8 days.

(21) Appl. No.: 15/847,624

(22) Filed: Dec. 19, 2017

(65) Prior Publication Data
US 2019/0041963 A1    Feb. 7, 2019

(51) Int. Cl.
G06F 1/32        (2019.01)
G01J 5/02        (2006.01)
G06F 1/3234      (2019.01)
G06F 3/01        (2006.01)
H04N 21/00       (2011.01)
H04N 11/24       (2006.01)

(52) U.S. Cl.
CPC .......... *G06F 1/3265* (2013.01); *G01J 5/0275* (2013.01); *G06F 3/011* (2013.01); *H04N 21/00* (2013.01); *G06F 2203/04806* (2013.01); *G09G 2340/04* (2013.01); *H04N 11/24* (2019.01)

(58) Field of Classification Search
CPC .............. G06F 1/3265; G06F 3/011; G06F 2203/04806; G01J 5/0275; H04N 11/002; H04N 21/00; H04N 11/24; G09G 2340/04
See application file for complete search history.

(56) References Cited

U.S. PATENT DOCUMENTS

| 2008/0074444 | A1  | 3/2008  | Morikawa et al. |
| 2010/0090899 | A1  | 4/2010  | Zhao et al. |
| 2011/0141114 | A1  | 6/2011  | Chen et al. |
| 2014/0118240 | A1* | 5/2014  | Pais .......... G09G 3/00 345/156 |
| 2016/0080448 | A1* | 3/2016  | Spears ......... H04L 65/602 709/219 |
| 2016/0336454 | A1  | 11/2016 | Endo |
| 2017/0223409 | A1  | 8/2017  | Baumann et al. |
| 2018/0288392 | A1* | 10/2018 | Hicks ......... G09G 5/00 |

FOREIGN PATENT DOCUMENTS

WO    2016051055    4/2016

OTHER PUBLICATIONS

International Search Report and Written Opinion from PCT/US2018/061867 notified Mar. 12, 2019, 15 pgs.

* cited by examiner

*Primary Examiner* — Vinh T Lam
(74) *Attorney, Agent, or Firm* — Green, Howard & Mughal LLP

(57) ABSTRACT

An apparatus is provided which comprises: a first circuitry to provide an estimate of a distance of a user from the apparatus; and a second circuitry to select a display resolution for displaying on a display panel of the apparatus, based at least in part on the estimate of the distance of the user from the apparatus.

21 Claims, 9 Drawing Sheets

DYNAMIC SELECTION OF DISPLAY RESOLUTION

BACKGROUND

Modern day display screens in various devices (e.g., televisions, laptops, smart phones, tablets, etc.) may be able to display content at a high resolution (e.g., at 4K resolution, at 8K resolution, or the like). However, in an example, displaying content at high resolution may consume relatively high power. In another example, if content is streamed over a network (e.g., the Internet), the high-resolution content may consume relatively high bandwidth.

BRIEF DESCRIPTION OF THE DRAWINGS

The embodiments of the disclosure will be understood more fully from the detailed description given below and from the accompanying drawings of various embodiments of the disclosure, which, however, should not be taken to limit the disclosure to the specific embodiments, but are for explanation and understanding only.

DETAILED DESCRIPTION

Figure 1:
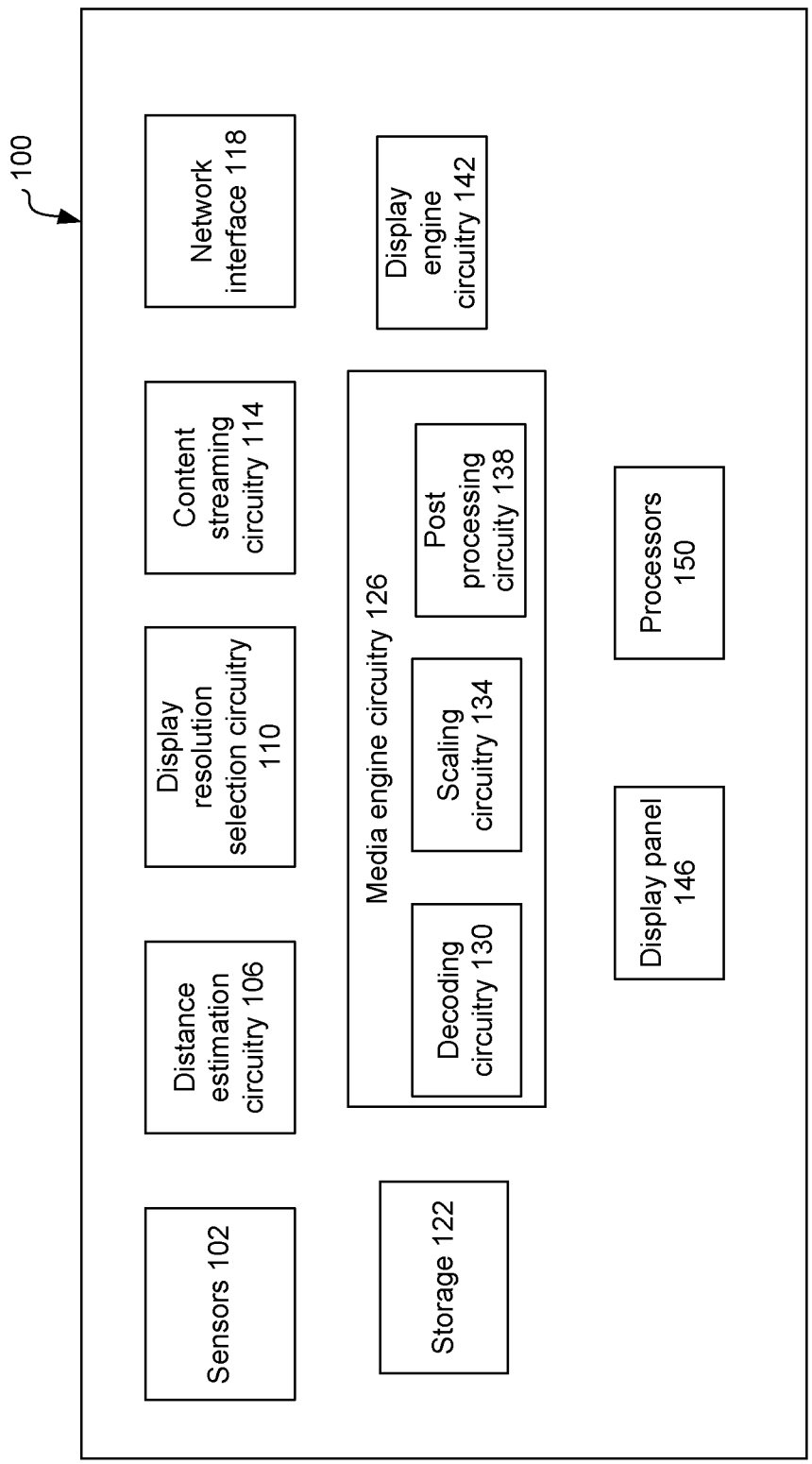
FIG. 1 illustrates a device that adaptively and dynamically adjusts a display resolution of a display panel, e.g., based on estimating a distance of one or more viewers from the device, according to some embodiments.

Human vision capability of distinguishing individual pixel of content displayed on a display screen of a device may depend on the display screen size and a viewing distance from the display screen. In an example, the closer a user gets to the display screen, the higher is the display resolution that the user may be able to comprehend. On the other hand, if the user is relatively far away from the display screen, the user may not be able to differentiate or distinguish between a high display resolution and a moderate display resolution.

A device may be able to display content at one of multiple display resolutions. In some embodiments, the display resolution of content to be displayed on a display screen may be adaptively and dynamically adjusted, based on estimating a distance of a user from the display screen. For example, if the user is relatively near the display screen, content may be displayed at relatively high resolution. On the other hand, if the user is relatively far from the display screen, content may be displayed at relatively low resolution. Opportunistically reducing the display resolution (e.g., if a user is estimated to be far away from the display screen) may reduce power consumption, memory usage, bandwidth, etc., without compromising any user experience, as discussed herein in further details herein. Other technical effects will be evident from the various embodiments and figures.

In the following description, numerous details are discussed to provide a more thorough explanation of embodiments of the present disclosure. It will be apparent, however, to one skilled in the art, that embodiments of the present disclosure may be practiced without these specific details. In other instances, well-known structures and devices are shown in block diagram form, rather than in detail, in order to avoid obscuring embodiments of the present disclosure.

Note that in the corresponding drawings of the embodiments, signals are represented with lines. Some lines may be thicker, to indicate more constituent signal paths, and/or have arrows at one or more ends, to indicate primary information flow direction. Such indications are not intended to be limiting. Rather, the lines are used in connection with one or more exemplary embodiments to facilitate easier understanding of a circuit or a logical unit. Any represented signal, as dictated by design needs or preferences, may actually comprise one or more signals that may travel in either direction and may be implemented with any suitable type of signal scheme.

Throughout the specification, and in the claims, the term "connected" means a direct connection, such as electrical, mechanical, or magnetic connection between the things that are connected, without any intermediary devices. The term "coupled" means a direct or indirect connection, such as a direct electrical, mechanical, or magnetic connection between the things that are connected or an indirect connection, through one or more passive or active intermediary devices. The term "circuit" or "module" may refer to one or more passive and/or active components that are arranged to cooperate with one another to provide a desired function. The term "signal" may refer to at least one current signal, voltage signal, magnetic signal, or data/clock signal. The meaning of "a," "an," and "the" include plural references. The meaning of "in" includes "in" and "on." The terms "substantially," "close," "approximately," "near," and "about," generally refer to being within +/−10% of a target value.

Unless otherwise specified the use of the ordinal adjectives "first," "second," and "third," etc., to describe a common object, merely indicate that different instances of like objects are being referred to, and are not intended to imply that the objects so described must be in a given sequence, either temporally, spatially, in ranking or in any other manner.

For the purposes of the present disclosure, phrases "A and/or B" and "A or B" mean (A), (B), or (A and B). For the purposes of the present disclosure, the phrase "A, B, and/or C" means (A), (B), (C), (A and B), (A and C), (B and C), or (A, B and C). The terms "left," "right," "front," "back," "top," "bottom," "over," "under," and the like in the description and in the claims, if any, are used for descriptive purposes and not necessarily for describing permanent relative positions.

FIG. 1 illustrates a device 100 that adaptively and dynamically adjusts a display resolution of a display panel 146, e.g., based on estimating a distance of one or more viewers from the device 100, according to some embodiments. In an example, the device 100 may be any appropriate device having a display panel (e.g., a display screen) that may display content at different resolutions. For example, the device 100 may be a laptop, a tablet, a notebook, a desktop, a television (TV), a smart phone, a mobile or cellular phone, an appropriate consumer electronics device, or the like. In an example, the device 100 (e.g., the display panel 146) may support multiple display resolutions.

For example, many modern-day consumer electronic devices (e.g., laptops and TVs) can display high resolution images using 4K resolution, which may refer to a horizontal screen display resolution in the order of 4,000 pixels. Different 4K resolution standards may be used. Merely as an example, ultra-high-definition-1 (UHD-1), is the 4K standard for television and computer monitors. The 4K display resolution (e.g., UHD-1) may also be referred to as 2160p display resolution, as UHD-1 has a resolution of 3840×2160 pixels, where "p" in 2160p may stand for progressive scan, e.g., non-interlaced display. The 4K resolution or the 2160p display resolution may be twice a horizontal and twice a vertical resolution of 1080p standard, or three times the horizontal and vertical resolutions of 720p standard.

The 8K resolution, or 8K Ultra high definition (UHD), is an ultra-high definition television (UHDTV) resolution in digital television and digital cinematography. The term "8K" refers to a horizontal resolution of 7,680 pixels, forming a total image dimensions of (7680×4320 pixels), and may also be referred to as 4320p.

The 1080p display resolution has a resolution of 1920× 1080 pixels, and is also known as Full HD (High definition) or FHD. In an example, 1080p is a set of HDTV high-definition video modes characterized by 1080 horizontal lines of vertical resolution.

The 720p display resolution has a resolution of 1280×720 pixels, and may be also referred to as HD Ready or standard HD. This may be a progressive HDTV signal format, with 720 horizontal lines and an aspect ratio (AR) of 16:9, also known as widescreen HDTV.

In an example, the 8K display resolution (e.g., also referred to as 7680p display resolution), the 4K display resolution (e.g., also referred to as 2160p display resolution), the 1080p display resolution, and the 720p display resolution are some example display resolutions that may possibly be supported by the display panel 146 of the device 100, although such specific example values of the display resolution do not limit the scope of this disclosure in any manner. In some other examples, the display panel 146 may support any other appropriate display resolutions. As will be discussed in further details herein, in some embodiments, the device 100 may dynamically and adaptively select a display resolution for displaying contents on the display panel 146, e.g., based on an estimation of distances of one or more users from the display panel 146. The content displayed on the display 146 may be any appropriate visual content, e.g., videos, images, texts, and/or any appropriate content that may be displayed on a display screen of a device.

In some embodiments, the device 100 comprises one or more sensors 102. In an example, the sensors 102 may be used for estimating distances of one or more users from the device 100 (e.g., from the display panel 146, or from the sensors 102). An output of the sensors 102 may be received by a distance estimation logic or a distance estimation circuitry 106 (henceforth also referred to as circuitry 106). In some embodiments, the sensors 102 and the circuitry 106, in combination, may estimate distances of one or more users from the device 100.

Merely as an example, the sensors 102 may comprise a camera that may capture images of a scene in front of the device 100, where the scene may include one or more users who are located in front of the device 100. In an example, the sensors 102 may comprise an Infrared (IR) camera. For example, the IR camera may be RealSense™ Camera SR300 from Intel®, or any other appropriate IR technology based camera. In some embodiments, the IR camera may comprise (or be attached to) an IR projector that illuminates the scene in front of the display panel 146 with a set of predefined, increasing spatial frequency coded IR patterns. These patterns may be warped by the scene, reflected back and captured by the IR camera. In an example, the IR camera pixel values may be analyzed and processed by the circuitry 106, which may estimate distances of one or more users from the device 100.

For example, the circuitry 106 may receive output from the sensors 102. Via an appropriate image or pattern recognition process, the circuitry 106 may identify if any user (or more than one users) is present in the images of the scene in front of the device 100. If one or more users are present, the circuitry 106 may also estimate a distance of the one or more users from the device 100.

In some embodiments, the sensors 102 may be mounted in a location in the device 100 from where the sensors 102 can view the front of the device 100. Merely as an example, if the device 100 is a TV, the sensor 102 may be mounted on top of the TV. In another example, if the device 100 is a laptop, the sensor 102 may be mounted on top of the screen of the laptop. In yet another example, if the device 100 is a cell phone or a tablet, the sensor 102 may be mounted near the front facing camera of the device 100, or may even be integrated with the front facing camera of the device 100.

Although in the example discussed above, the sensors 102 may be a camera (e.g., an IR camera), in some other embodiments, the sensors 102 may comprise any other appropriate type of sensors, e.g., any sensors that may be capable of generating data representative of distances of one or more users from the device 100. For example, the sensors 102 may comprise a thermal camera that generates a thermal image of a user to determine a distance of the user from the device 100, one or more cameras capable of taking three-dimensional (3D) images, a stereo RGB (red-green-blue) camera, camera(s) or sensor(s) capable of generating depth information of a user, and/or the like).

In an example, the sensors 102 (or at least a part of the sensors 102) may be external to the device 100. For example, the sensor 102 may comprise a hand-held device (e.g., a controller of a video game, a mouse, a keyboard, a touchpad, etc.) that a user may hold (or at least intermittently in contact with) while viewing the display panel 146. Based on estimating a distance between the hand-held device from the device 100, the circuitry 106 may estimate a distance of the user from the device 100.

Figure 2:
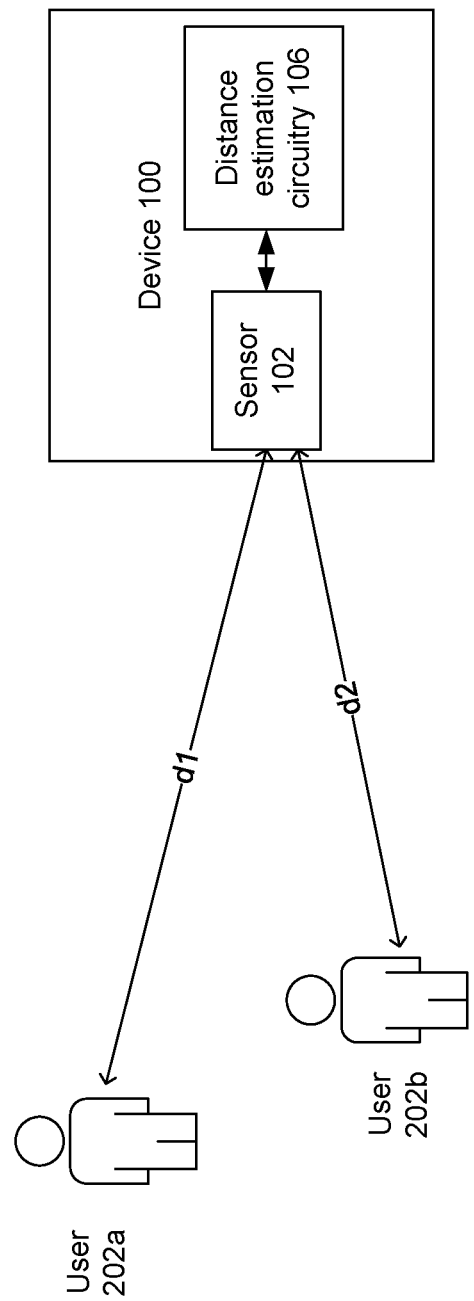
FIG. 2 illustrates operations of one or more sensors and a distance estimation circuitry in estimating distances of one or more users from the device of FIG. 1, according to some embodiments.

FIG. 2 illustrates operations of the sensors 102 and the distance estimation circuitry 106 in estimating distances of one or more users from the device 100 of FIG. 1, according to some embodiments. In the example of FIG. 2, two users 202a and 202b may be located in the scene in front of the device 100, e.g., at distances d1 and d2, respectively, from the device 100. The sensors 102 may provide an output that is indicative of the distances d1 and d2. The circuitry 106 may analyze the output of the sensors 102 (e.g., one or more images of the scene in front of the device 100), and using image recognition or pattern recognition algorithms, identify the presence of the two users in the scene. The circuitry 106 may also estimate the distances d1 and d2 that the users 202a and 202b are respectively located from the device 100.

In an example, different parts of a body of a user may be at different distance from the device 100. In some embodiments, the circuitry 106 may estimate the distance d1 from the eyes (or head) of the user 202a to the device 100, and similarly, estimate the distance d2 from the eyes (or head) of the user 202b to the device 100. Thus, the circuitry 106 may use a user's eyes or head as a reference point to estimate the distance of the user from the device 100 (e.g., because the estimated distance may eventually be used to determine how the user would visually comprehend content displayed on the display panel 146).

In some embodiments, the device 100 may comprise a display resolution determination logic or a display resolution selection circuitry 110 (also referred to herein as circuitry 110). The circuitry 110 may adaptively select an appropriate display resolution (e.g., from a plurality of display resolutions supported by the device 100), and may cause displaying of contents on the display panel 146 at the selected display resolution.

In an example, a person (e.g., a person with regular or normal vision, such as 20/20 ft vision) may resolve about 60 pixels per degree on a display panel (e.g., the display panel 146). This may, for example, correspond to recognizing the letter "E" on the 20/20 line of a Snellen eye chart from 20 feet away. Human vision capability of distinguishing individual pixel of content displayed on a display screen may depend on a display screen size and viewing distance from the display screen. In an example, the closer a person gets to a display panel, the higher is the display resolution that a person may be able to comprehend. For example, if the person sits very near to a TV screen, the person may be able to differentiate between a 1080p display resolution and a 4K display resolution (e.g., with the 4K display resolution providing a better viewing experience for most people). On the other hand, if the person sits far away from the TV screen, the person may not be able to differentiate or distinguish between the 1080p display resolution and the 4K display resolution (e.g., with the 4K and the 1080p display resolutions providing substantially similar viewing experience for most people).

Figure 3:
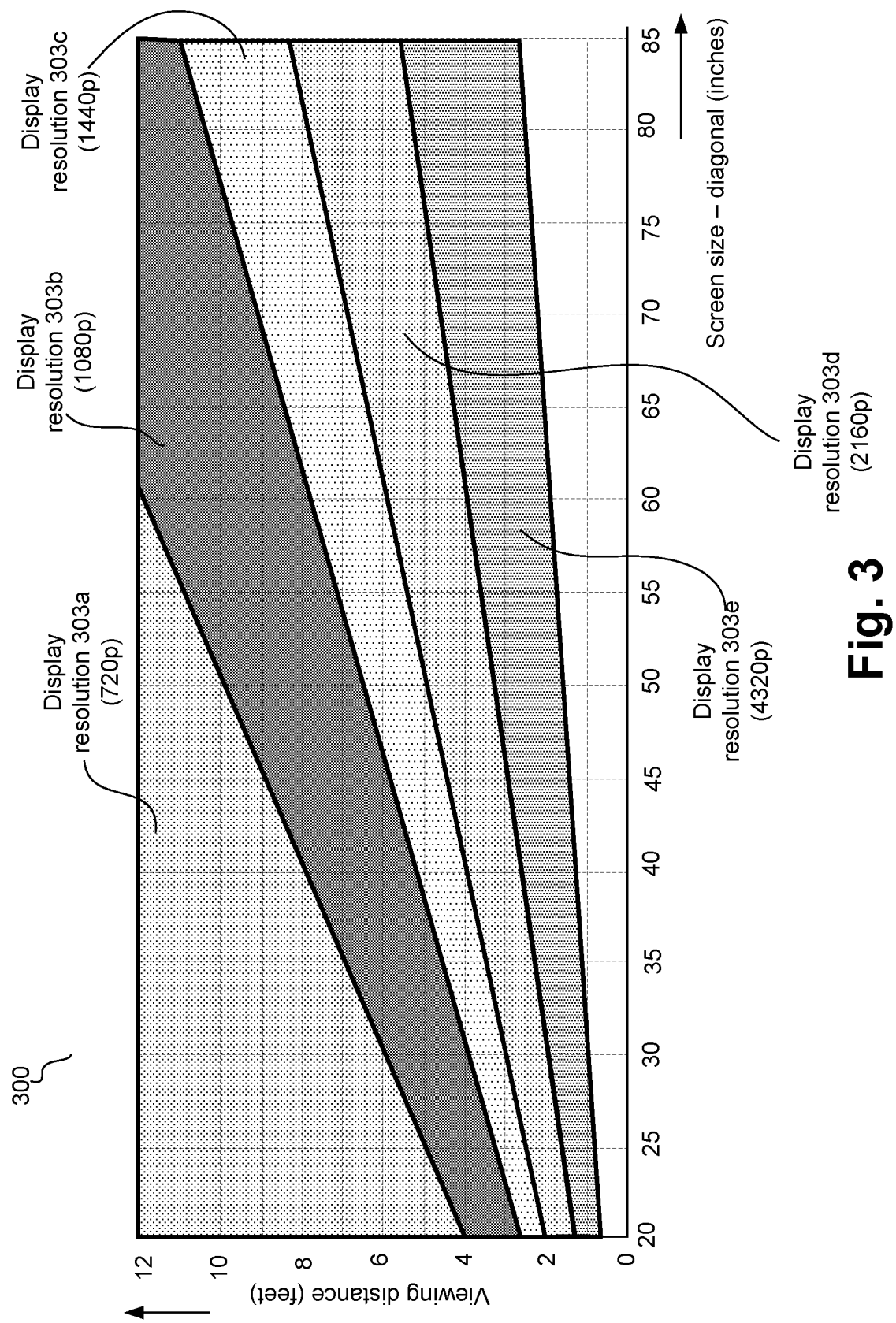
FIG. 3 illustrates a graph depicting a relationship between viewing distance of a user from a television (TV), a screen size of the TV, and a recommended or optimal (or near optimal) display resolution of the TV.

FIG. 3 illustrates a graph 300 depicting a relationship between viewing distance of a user from a TV (e.g., in Y axis and measured in feet), a screen size of the TV (e.g. where the screen is measured diagonally in inches, in X axis), and a recommended or optimal (or near optimal) display resolution. The recommended display resolution in the graph 300 may provide satisfactory viewing experience for most people.

The graph 300 may be divided in different zones corresponding to various recommended display resolutions. For example, for a screen size of 50 inches (e.g., a 50-inch TV), if the viewer sits about 10 feet or more from the TV, a display resolution of 303a may be sufficient for satisfactory viewing experience for most people, where the display resolution of 303a may be about 720p. Put differently, from a distance of 10 feet or more, a person may have about similar viewing experiences with 720p display resolution, with 1080p display resolution, or with even higher display resolutions. For example, the person's eyes may not be able to discern between differences in display resolutions of 720p and 1080p, or even higher, from such a relatively long distance.

If the viewer sits between about 10 feet and about 6.5 feet from the TV, a display resolution of 303b may be sufficient for satisfactory viewing experience for most people, where the display resolution of 303b may be about 1080p. Put differently, from the distance range of about 10-6.5 feet, a person may have about similar viewing experiences with 1080p display resolution, with 1440p display resolution, or with even higher display resolutions (e.g., the person's eyes may not be able to discern between differences in display resolutions of 1080p and higher for this distance range). However, the display resolution of 720p may be unsatisfactory for most users for this distance range (e.g., at least not as satisfactory as the 1080p display resolution).

Similarly, zones corresponding to various other display resolutions 303c, 303d, and 303e are illustrated in FIG. 3. The various values depicted in the graph 300 are merely examples, and do not limit the scope of this disclosure.

Table 1 below depicts a relationship between a plurality of display resolutions, and a recommended or ideal (or near ideal) viewing distance in feet for each of the plurality of display resolutions. The table 1 is for a display panel with a diagonal size of 13 inches (e.g., display panel of a laptop). The various values in the table below are merely examples, and do not limit the scope of this disclosure.

| Display Size (inches) | Resolution (pixel) | Ideal Viewing distance (feet) |
|---|---|---|
| 13 | 1920 × 1080 (e.g., 1080 p) | 1.7 |
| 13 | 3840 × 2160 (e.g., 2160 p) | 0.9 |
| 13 | 7680 × 4320 (e.g., 4320 p) | 0.3 |

Thus, as seen from the graph 300 and the Table 1, for a specific screen size, the further a user is from a display panel, the lower may be the recommended display resolution for satisfactory viewing by the user.

Referring again to FIG. 1, in some embodiments, the circuitry 106 may estimate distances of one or more users from the display panel 146. The circuitry 110 may use the estimated distances to adaptively and dynamically select a display resolution for the display panel 146.

Figure 4:
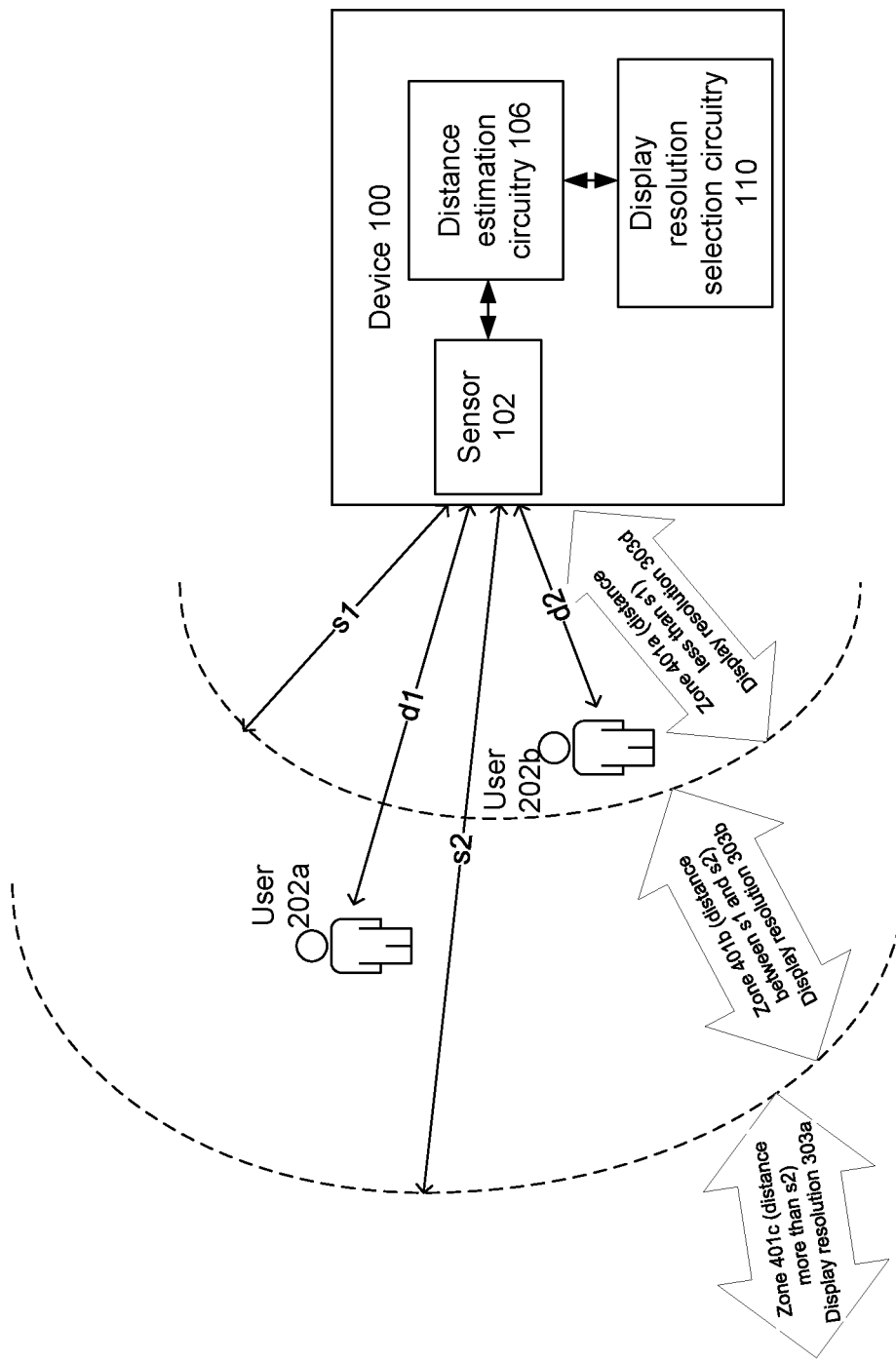
FIG. 4 illustrates an example operation of a display resolution determination circuitry of the device of FIG. 1, according to some embodiments.

FIG. 4 illustrates an example operation of the display resolution determination circuitry 110 of the device 100 of FIG. 1, according to some embodiments. In some embodiments, the circuitry 110 may divide the scene in front of the device 100 into multiple spatial zones. For example, a zone 401a may cover sections of the scene or area in front of the device 100, which may be at a distance less than s1 from the device 100. A zone 401b may cover sections of the scene or area in front of the device 100, which may be between distances s1 and s2 from the device 100. A zone 401c may cover sections of the scene or area in front of the device 100, which may be at more than distance s2 the device 100.

Although three zones are illustrated in FIG. 4, any other number of zones may also be envisioned. The distances s1 and s2 may be selected based on a variety of factors, e.g., a screen size of the display panel 146, threshold distances to be used for changing display resolutions, using information from the graph 300 and/or the table 1 (or information from another similar data source), etc.

In some embodiments, each zone 401 may be associated with a corresponding display resolution. Merely as an example and without limiting the scope of this disclosure, assume that the screen size of the display panel is 50 inches (e.g., when measured diagonally). In some embodiments, the screen size of 50 inches and the data in the graph 300 (or data from another source) may be used to assign a display resolution to a respective one of the zones 401a, 401b, and 401c.

For example, assume that the device supports display resolution 303a (e.g., 720p), display resolution 303b (e.g., 1080p), and display resolution 303d (e.g., 2160p) of FIG. 3. For such an example, referring to FIGS. 3 and 4, the distance s1 may be about 6.5 feet, and the distance s2 may be about 10 feet.

Thus, for example, if the viewing distance is more than s2 or 10 feet, the recommended display resolution may be display resolution 303a, as seen from graph 300. Accordingly, zone 401c of FIG. 4 may be associated with the display resolution 303a.

If the viewing distance is between about 10 feet (e.g., s2) and about 6.5 feet (e.g., p1), the recommended display resolution may be display resolution 303b, as seen from graph 300. Accordingly, zone 401b of FIG. 4 (which is at distances between s1 and s2 from the device 100, where s1 is about 6.5 feet and s2 is about 10 feet) may be associated with the display resolution 303b.

If the viewing distance is between 6.5 feet and about 5 feet, the recommended display resolution may be display resolution 303c, as seen from graph 300. However, the display resolution 303c may not be supported by the device 100. Accordingly, the display resolution 303d may be used for this distance range. Also, for viewing distance of less than 5 feet, the recommended display resolution may be display resolution 303d, as seen from graph 300. Thus, for the device 100, for any viewing distance of less than 6.5 feet, the recommended display resolution may be display resolution 303d. Accordingly, zone 401a (which is at less than distance s1 from the device 100, where s1 is about 6.5 feet) of FIG. 4 may be associated with the display resolution 303d.

For example, the circuitry 106 and/or the circuitry 110 may estimate a zone where a user (e.g., eyes or head of the user) is located. For example, a zone of a user nearest to the device 100 may be used. In the example of FIG. 4, the circuitry 106 may estimate that the user 202a is at a distance d1 from the device 100, and the user 202b is at a distance d2 from the device 100. As the user 202b is the nearest user to the device 100, the circuitry 110 may take into account the distance d2 (and not distance d1) while selecting the display resolution for the display panel 146. As the user 202b is within the zone 401a, the circuitry 110 may select the display resolution 303d (e.g., the highest display resolution supported for the device 100).

Thus, when a user is very near to the device 100 (e.g., in zone 401a), the circuitry 110 may select a high or highest display resolution (e.g., display resolution 303d) that is supported by the device 100. When the user is at a moderate distance from the device 100 (e.g., in zone 401b), the circuitry 110 may select a moderate display resolution (e.g., display resolution 303b) that is supported by the device 100. When the user is far away from the device 100 (e.g., in zone 401c), the circuitry 110 may select a low or lowest display resolution (e.g., display resolution 303a) that is supported by the device 100. Thus, the display resolution may dynamically change as an estimation of a location of the nearest user changes.

Referring again to FIG. 1, in some embodiments, the device 100 may comprise a content streaming circuitry 114 (also referred to as circuitry 114) and a network interface 118. The network interface 118 may provide connectivity of the device 100 to a network, e.g., a local area network, a wide area network, a personal area networks, the Internet, etc. The network interface 118 may provide, for example, a wired connectivity (e.g., an Ethernet connection, and/or the like) and/or a wireless connectivity (e.g., a cellular connection, a Bluetooth connection, a near field connection, a Wi-Fi connection, and/or the like).

Figure 5:
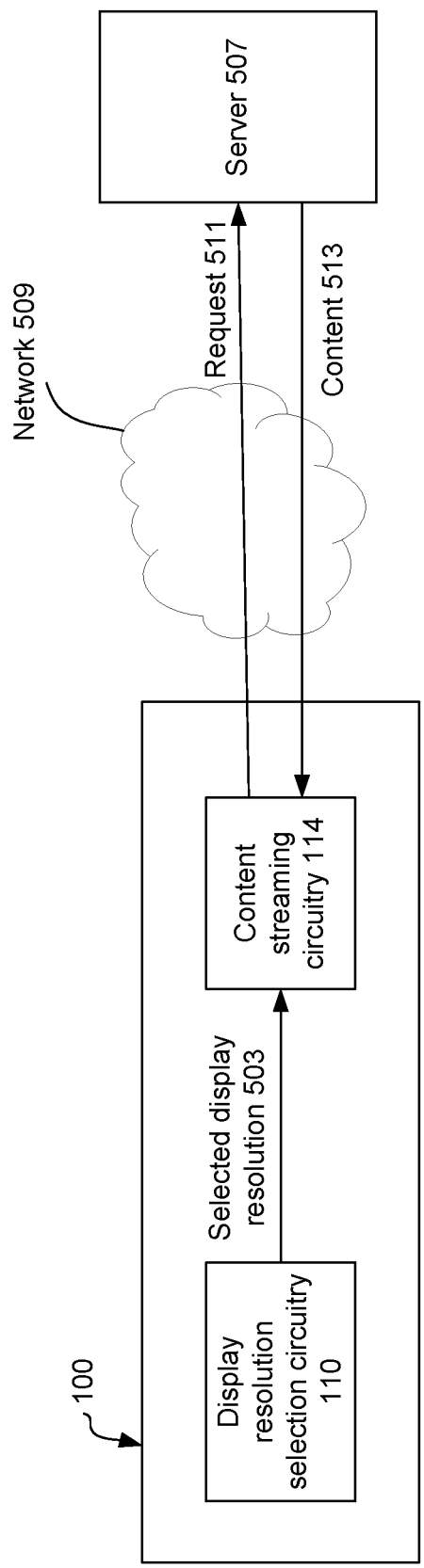
FIG. 5 illustrates a content streaming circuitry of the device of FIG. 1 requesting, from a server over a network, content at a display resolution selected by a display resolution selection circuitry, according to some embodiments.

In some embodiments, the circuitry 114 may receive content from a centralized location, such as a server (e.g., a streaming media server, not illustrated in FIG. 1), via the network interface 118. FIG. 5 illustrates the content streaming circuitry 114 of the device 100 requesting, from a server 507 over a network 509, content at a display resolution 503 selected by the display resolution selection circuitry 110, according to some embodiments. In FIG. 5, merely some of the components of the device 100 is illustrated.

The circuitry 110 may select the display resolution 503, e.g., as discussed with respect to FIG. 4. The selected display resolution 503 may be any of the display resolutions 303a, 303b, or 303d of FIG. 4, or any other appropriate display resolution. The selection of the display resolution 503 may be based at least in part on an estimation of a distance of a nearest user from the device 100, as discussed with respect to FIGS. 2-4.

In some embodiments, the circuitry 114 may transmit one or more requests 511 to the server 507 for content. In an example, the requests 511 may provide an indication of the display resolution 503. Thus, the requests 511 may request content at the display resolution 503.

In an example, the server 507 may provide content at merely one display resolution (e.g., merely at 1080p display resolution). In such an example, the irrespective of the requests 511, the server 507 may transmit content at the display resolution supported by the server 507.

In another example, the server 507 may provide content at one of multiple display resolutions. Merely as an example, the server 507 may provide content at 720p display resolution, 1080p display resolution, 2160p display resolution, and/or the like. In such an example, the server 507 may transmit content 513 to the device 100 at the requested display resolution 503 (or a display resolution that is close to the display resolution 503), e.g., assuming the network bandwidth and/or other factors (e.g., load of the server 507) permit transmission of content at the requested display resolution 503.

Merely as an example, if the requested display resolution 503 is 1440p and the server 507 merely supports display resolutions 720p, 1080p and 2160p, then the server 507 may transmit content at the next higher display resolution of 2160p. In another example, if the requested display resolution 503 is 4320p and the server 507 merely supports display resolutions 720p, 1080p and 2160p, then the server 507 may transmit content at the nearest display resolution of 2160p.

In some embodiments, the server 507 and/or the circuitry 114 may also take into account various other factors, while determining a display resolution for the content 513 transmitted to the device 100. Example of such factors may include, but not limited to, bandwidth available between the device 100 and the server 507, a Quality of Service (QoS) agreement between the device 100 and the server 507, load on the server 507, and/or the like.

Thus, in some examples, the circuitry 114 may receive content 513 from the server 507 at the requested display resolution 503. In some other examples, the circuitry 114 may receive content 513 from the server 507 at a display resolution that is different from the requested display resolution 503.

In some embodiments, the device 100 and the server 507 may employ Dynamic Adaptive Streaming over HTTP (DASH), also known as MPEG-DASH, for transmitting the requests 511 and/or receiving the content 513.

Referring again to FIG. 1, in some embodiments, the device 100 may comprise a media engine circuitry 126 (also referred to as circuitry 126) and a display engine circuitry 142. In an example, the circuitry 126 comprises a decoding circuitry 130 (also referred to as circuitry 130), a scaling circuitry 134 (also referred to as circuitry 134), and/or a post processing circuitry 138 (also referred to as circuitry 138).

In some embodiments, the device 100 may further comprise one or more processors 150. In an example, the processors 150 may be graphic processor, e.g., a graphics processing unit (GPU). In some embodiments, the processors 150 may control operations of one or more circuitries of the device 100. In some embodiments, one or more circuitries of the device 100 may be implemented using the processors 150. In some embodiments, the processors 150 may include one or more physical devices, such as microprocessors, application processors, microcontrollers, programmable logic devices, or other processing means.

Figure 6:
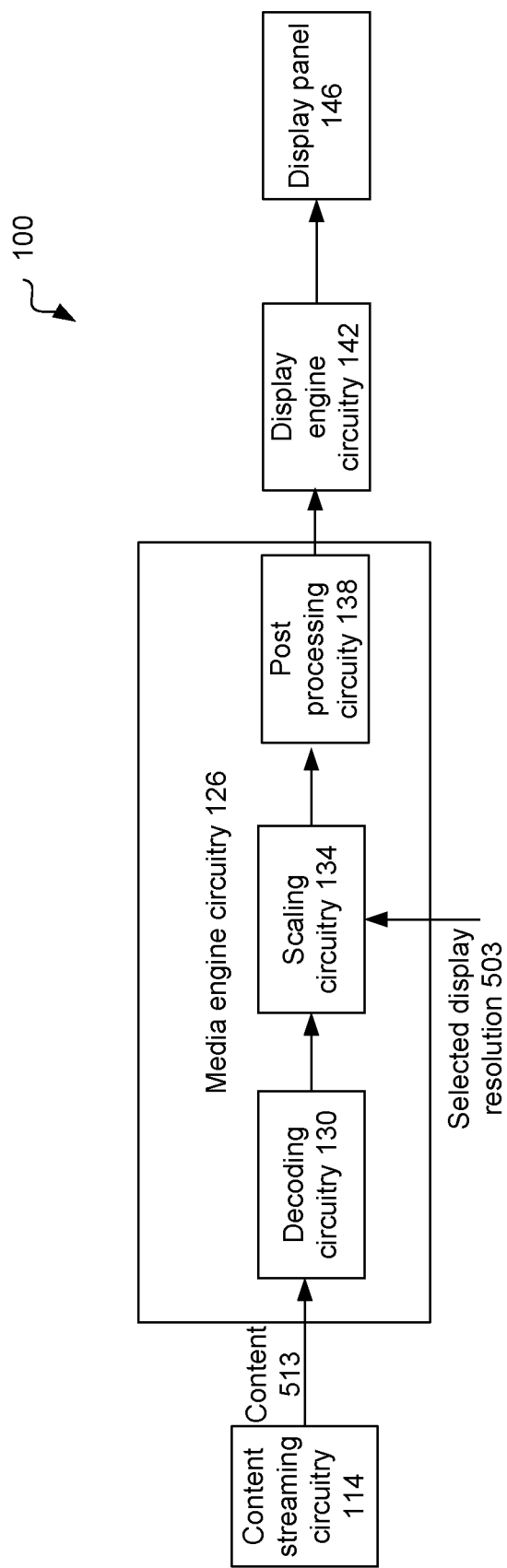
FIG. 6 illustrates a media engine circuitry and a display engine circuitry of the device of FIG. 1 receiving and processing streaming content, according to some embodiments.

FIG. 6 illustrates the media engine circuitry 126 and the display engine circuitry 142 of the device 100 of FIG. 1 receiving and processing streaming content, according to some embodiments. In an example, the streaming content 513 received from a streaming media server may in a compressed format, e.g. a H.264 format, a HEVC (High Efficiency Video Coding) format, and/or the like. In some embodiments, the circuitry 126 may receive content 513 from the circuitry 114. For example, as discussed with respect to FIG. 5, the circuitry 114 may receive the content 513 from the server 507. As discussed herein previously, in some examples, the content 513 from the server 507 may be at the requested display resolution 503. In some other examples, the content 513 from the server 507 may be at a display resolution that is different from the requested display resolution 503.

In some embodiments, the circuitry 130 receives the content 513 (e.g., which may be in a compressed format), and decodes the content 513 (e.g., decodes the content 513 into an uncompressed format). For example, the circuitry 130 may un-compress the content 513 to an appropriate pixel format (e.g., to a standard NV12 pixel format), which may be handled by downstream circuitries.

The circuitry 134 may receive the uncompressed content 513 from the circuitry 130. The circuitry 134 may also receive an indication of the selected display resolution 503 (e.g., from the circuitry 110). If the content 513 from the server 507 is at the requested display resolution 503, the circuitry 134 may not perform any scaling operation on the content 513. On the other hand, if the content 513 from the server 507 is at a display resolution that is different from the requested display resolution 503, the circuitry 134 may scale the content 513 to the display resolution 503. For example, the circuitry 134 may upscale or downscale the content 513, e.g., depending on whether the display resolution of the content 513 is lower or higher than the selected display resolution 503. Thus, the output of the scaling circuitry 134 may be the content 513 at the display resolution 503.

The circuitry 138 may perform one or more post processing operations on the content 513. Examples of processing operations may include, but not limited to, color correction, cropping, sharpening, scaling, adding special effects, etc. The output of the circuitry 138 may then be rendered by the circuitry 142 on the display panel 146 at the display resolution 503.

Thus, in some embodiments, although the device 100 can support a high display resolution (e.g., a 4K or an 8K display resolution), the device 100 may dynamically and opportunistically reduce the display resolution used in the display panel 146. For example, as discussed, if a viewer of the device 100 is at sufficient distance away from the device (e.g., as discussed with respect to FIG. 3), the device 100 may fetch and display content at a reduced display resolution. In an example, reducing the display resolution may result in reduced power consumption, reduced bandwidth usage, etc. For example, as the content 513 may be received at the reduced display resolution by the circuitry 114 from the server, the power and/or memory usage at the circuitries 130, 134, 138, 135 may be lower (e.g., compared to a scenario when these circuitries handle the content at the highest supported display resolution). Similarly, the display panel 146 may also consume less power in displaying the content at the reduced display resolution. Also, streaming the content 513 from the server 507 at the reduced display resolution may consume less bandwidth, In an example, even if the content 513 is received at a high display resolution, the scaling circuitry 134 may downscale the content to the reduced display resolution, thereby achieving reduced power and/or memory consumption at the downstream components. Furthermore, such technical effects may be achieved without impacting or reducing the user experience (e.g., without impacting or reducing the viewing satisfaction of the viewers of the display panel 146). For example, as discussed with respect to FIGS. 2-4, if the viewer is sufficiently far away from the display panel 146, the reduction in the display resolution may not be noticeable to the viewer. Put differently, due to a relatively long distance between the viewer and the device, any reduction in the display resolution would be visually indistinguishable to the viewer.

In FIGS. 5-6, it is assumed that content is streamed from the server 507 over the network 509. However, in some embodiments, instead of or in addition to streaming content from the server 507, content may also be stored locally in the device 100, e.g., in a storage 122 of the device 100.

Figure 7:
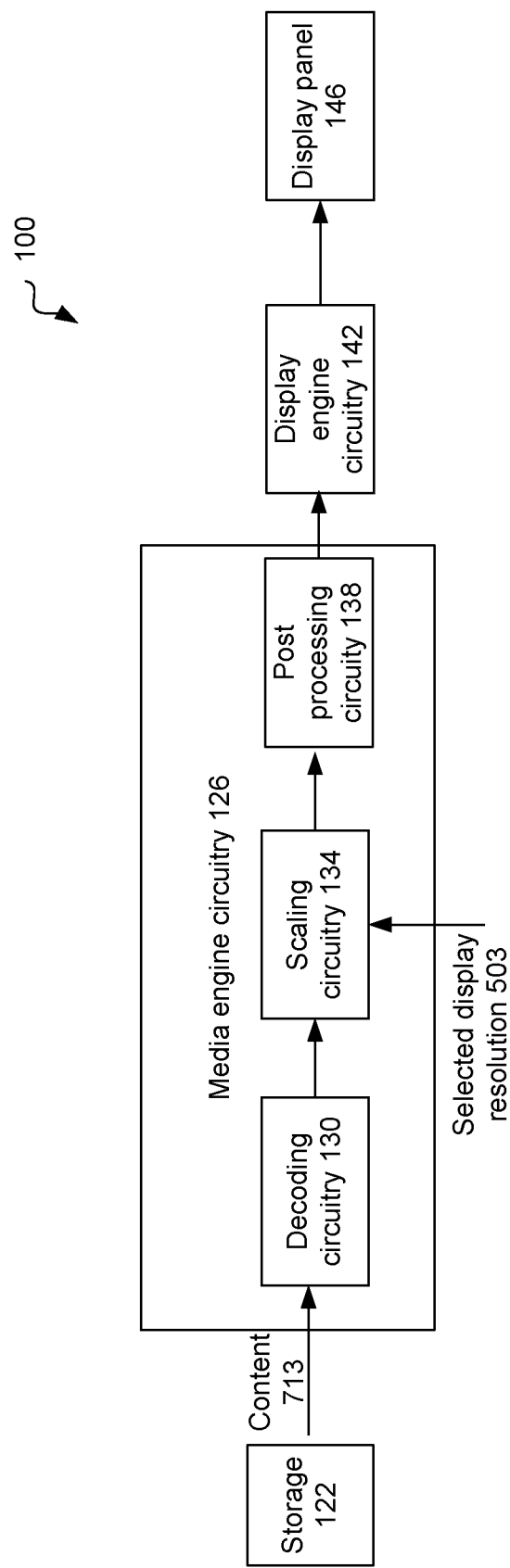
FIG. 7 illustrates a media engine circuitry and a display engine circuitry of the device of FIG. 1 receiving and processing content stored locally in a storage within the device, according to some embodiments.

FIG. 7 illustrates the media engine circuitry 126 and the display engine circuitry 142 of the device 100 of FIG. 1 receiving and processing content 713 stored locally in the storage 122 within the device 100, according to some embodiments. The content 713 may be stored in the storage 122 at a display resolution that may be same as, or different from, the selected display resolution 503.

In some embodiments, the circuitry 130 may receive the content 713 from the storage 122. The circuitry 130 may decode the content 713 received from the storage 122. For example, the circuitry 130 may un-compress the content 713 to an appropriate format (e.g., to a NV12 format), which may be handled by downstream circuitries.

The circuitry 134 may receive the uncompressed content 713 from the circuitry 130. The circuitry 134 may also receive an indication of the selected display resolution 503 (e.g., from the circuitry 110). If the content 713 from the storage 122 is at the requested display resolution 503, the circuitry 134 may not perform any scaling operation on the content 713. On the other hand, if the content 713 from the storage 122 is at a display resolution that is different from the requested display resolution 503, the circuitry 134 may scale the content 713 to the display resolution 503. For example, the circuitry 134 may upscale or downscale the content 713, e.g., depending on whether the display resolution of the content 713 is lower or higher than the display resolution 503. Thus, the output of the scaling circuitry 134 may be the content 713 at the display resolution 503.

The circuitry 138 may perform one or more post processing operations on the content 713. Examples of processing operations may include, but not limited to, color correction, trimming, re-sampling, adding special effects, etc. The output of the circuitry 138 may then be rendered by the circuitry 142 on the display panel 146 at the display resolution 503.

Thus, similar to FIG. 6, in FIG. 7 the scaling circuitry 134 may opportunistically downscale the content 713, e.g., to reduce overall power consumption of the device 100, without impacting any viewer satisfaction. For example, due to the relatively long distance between a user and the device (e.g., as discussed with respect to FIG. 4), any reduction in the display resolution may be indistinguishable to the user.

Merely as an example, for a 13-inch display of a laptop (e.g., where a video at 30 frames per second (fps) is being played), a power consumption for displaying the video at 1080p resolution may be about 4.14 Watt (W), whereas a power consumption for displaying the video at 2160p resolution may be about 6.9 W. Thus, a power savings of about 2.76 W (e.g., 6.9 W-4.14 W) may be realized when opportunistically switching from the 2160p display resolution to the 1080p display resolution. In an example, operating the sensors 102 may also consume some power. Assuming that the sensors 102 are operated at 30 fps and depth mode of the sensors 102 are enabled (e.g., the sensors 102 are able to detect a distance of a user from the device 100), the sensors 102 may consume power of about 1.15 W. Thus, even after taking into account the power consumption of the sensors 102, a power savings of about 1.61 W (e.g., 2.76 W-1.15 W) may be realized when opportunistically switching from the 2160p display resolution to the 1080p display resolution.

Referring again to FIG. 1, in some embodiments, the sensors 102 for monitoring the scene in front of the device 100 may be continuously switched on (e.g., the sensors 102 may continuously monitor the scene). In some other embodiments, the sensors 102 may be periodically or intermittently switched on (e.g., the sensors 102 may periodically or intermittently monitor the scene). In some other embodiments, the sensors 102 may be triggered in response to a user starting a video playback session on the device 100. In some other embodiments, the sensors 102 may be triggered in response to a loss of AC power (e.g., when the device 100 is supported by battery power, and hence, any incremental power savings may be useful). In some other embodiments, the sensors 102 may be switched on by a user of the device 100.

In some embodiments, the sensors 102 may be switched on for longer durations (e.g., the sensors may be switched on more frequently and/or for longer durations, or switched on continuously), e.g., when the circuitry 106 determines frequent movement of users on the scene. In some embodiments, the off period of the sensors 102 may be increased (e.g., the sensors may be switched on less frequently and/or for shorter durations) when the user is identified to be idle and not moving.

In some embodiments, the sensors 102 may be switched on for longer durations (e.g., the sensors may be switched on more frequently and/or for longer durations), e.g., when the display panel 146 is displaying at a reduced or lower display resolution (e.g., such that whenever the user moves near the device 100, the display panel 146 can almost immediately switch to a higher resolution, thereby not sacrificing any user experience).

On the other hand, in some embodiments, the sensors 102 may be switched on for shorter durations (e.g., the sensors may be switched on less frequently and/or for shorter durations), e.g., when the display panel 146 is displaying at a higher display resolution (e.g., whenever the user moves farther from the device 100, the display panel 146 can wait for some time before switching to a lower resolution—such delay does not compromise any user experience).

In some embodiments, when the user is not moving, the sensors 102 may capture images of the scene at a relatively lower resolution. However, when the user is detected to be moving, the sensors 102 may capture images of the scene at a relatively higher resolution (e.g., such that relatively more accurate estimation of distance of a user from the device 100 may be provided).

In some embodiments, the opportunistic reduction in the display reduction may be enabled when, for example, the device 100 is not receiving power from an Alternating Current (AC) source via a power adapter (not illustrated in the figures), and the device 100 is powered by a battery (not illustrated in the figures). In some other embodiments, the opportunistic reduction in the display reduction may be enabled irrespective of the power source of the device 100.

Figure 8:
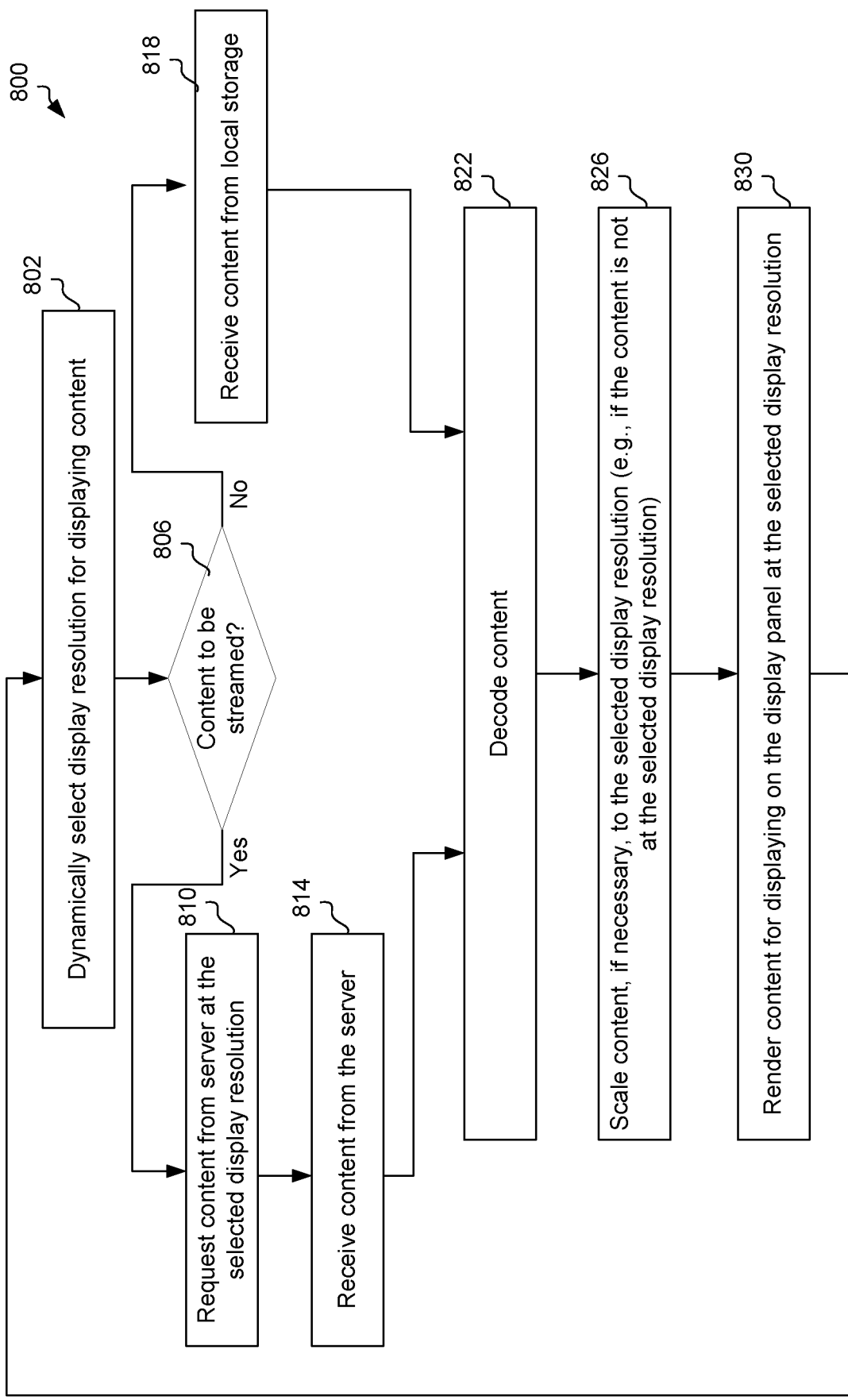
FIG. 8 illustrates a flowchart depicting a method for dynamically selecting a display resolution and displaying content on a display panel of a device in accordance with the selected display resolution, based at least in part on an estimate of distances of one or more users from the device, according to some embodiments.

FIG. 8 illustrates a flowchart depicting a method 800 for dynamically selecting a display resolution and displaying content on a display panel of a device (e.g., display panel 146 of the device 100) in accordance with the selected display resolution, based at least in part on an estimate of distances of one or more users from the device, according to some embodiments. Although the blocks in the flowchart with reference to FIG. 8 are shown in a particular order, the order of the actions can be modified. Thus, the illustrated embodiments can be performed in a different order, and some actions/blocks may be performed in parallel. Some of the blocks and/or operations listed in FIG. 8 may be optional in accordance with certain embodiments. The numbering of the blocks presented is for the sake of clarity and is not intended to prescribe an order of operations in which the various blocks must occur.

The method 800 starts at 802, where a display resolution may be dynamically selected for displaying content (e.g., by the circuitry 110, as discussed with respect to FIG. 4). In some embodiments, the dynamic selection of the display resolution may be based on estimating distance of a nearest user of one or more users from the display panel of the device 100.

At 806, a determination may be made as to whether content to be displayed is to be streamed (e.g., from the server 507), or received from a local storage on the device 100. If "Yes" at 806 (e.g., content is to be streamed), at 810, the device 100 (e.g., the circuitry 114) may request content from the server (e.g., server 507) at the selected display resolution (e.g., display resolution 503), as discussed with respect to FIG. 5. At 814, the device 100 (e.g., the circuitry 114) may receive content (e.g., content 513) from the server, as discussed with respect to FIG. 5. Subsequently, the method 800 may proceed to operations at block 822.

On the other hand, if "No" at 806 (e.g., content is not to be streamed), at 818, content (e.g., content 713) may be received from a local storage (e.g., storage 122), as discussed with respect to FIG. 5. Subsequently, the method 800 may proceed to operations at block 822.

In some examples, the content received at 814 and/or 818 may be at the selected display resolution (e.g., as selected at 801), e.g., as discussed with respect to FIGS. 5-7). In some other examples, the content received at 814 and/or 818 may be at a display resolution that is different from the selected display resolution.

At 822, the content received at 814 and/or 818 may be decoded (e.g., by the circuitry 130). At 826, the content may be scaled (e.g., either up-scaled, or downscaled, by the circuitry 134), if necessary. For example, the scaling may be performed if the content is not at the selected display resolution. In an example, the scaling operations at block 826 may be skipped if the content received at 814 and/or 818 is already at the selected display resolution. At 830, the content may be rendered for displaying on the display panel (e.g., display panel 146) at the selected display resolution.

Figure 9:
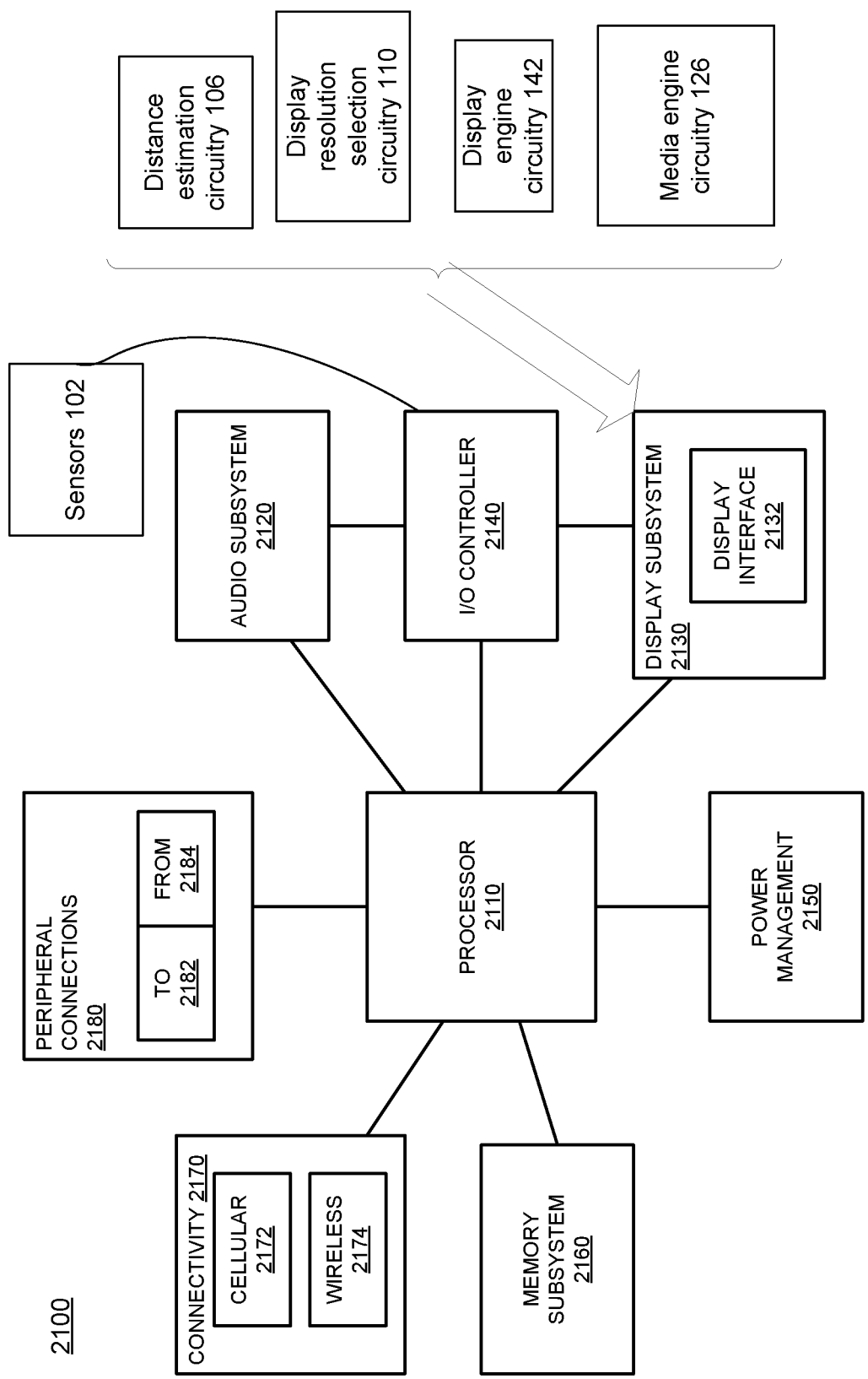
FIG. 9 illustrates a computing device, a smart device, a computing device or a computer system or a SoC (System-on-Chip), where the computing device may dynamically select a display resolution and display content on a display panel of the computing device in accordance with the selected display resolution, based at least in part on an estimate of distances of one or more users from the computing device, according to some embodiments.

FIG. 9 illustrates a computing device 2100, a smart device, a computing device or a computer system or a SoC (System-on-Chip) 2100, where the computing device 2100 may dynamically select a display resolution and display content on a display panel of the computing device 2100 in accordance with the selected display resolution, based at least in part on an estimate of distances of one or more users from the computing device 2100, according to some embodiments. It is pointed out that those elements of FIG. 9 having the same reference numbers (or names) as the elements of any other figure can operate or function in any manner similar to that described, but are not limited to such.

In some embodiments, computing device 2100 represents an appropriate computing device, such as a computing tablet, a mobile phone or smart-phone, a laptop, a desktop, an IOT device, a server, a set-top box, a wireless-enabled e-reader, a Television, or the like. It will be understood that certain components are shown generally, and not all components of such a device are shown in computing device 2100.

In some embodiments, computing device 2100 includes a first processor 2110. In an example, the processor 2110 is a GPU. The various embodiments of the present disclosure may also comprise a network interface within 2170 such as a wireless interface so that a system embodiment may be incorporated into a wireless device, for example, cell phone or personal digital assistant.

In one embodiment, processor 2110 can include one or more physical devices, such as microprocessors, application processors, microcontrollers, programmable logic devices, or other processing means. The processing operations performed by processor 2110 include the execution of an operating platform or operating system on which applications and/or device functions are executed. The processing operations include operations related to I/O (input/output) with a human user or with other devices, operations related to power management, and/or operations related to connecting the computing device 2100 to another device. The processing operations may also include operations related to audio I/O and/or display I/O.

In one embodiment, computing device 2100 includes audio subsystem 2120, which represents hardware (e.g., audio hardware and audio circuits) and software (e.g., drivers, codecs) components associated with providing audio functions to the computing device. Audio functions can include speaker and/or headphone output, as well as microphone input. Devices for such functions can be integrated into computing device 2100, or connected to the computing device 2100. In one embodiment, a user interacts with the computing device 2100 by providing audio commands that are received and processed by processor 2110.

Display subsystem 2130 represents hardware (e.g., display devices) and software (e.g., drivers) components that provide a visual and/or tactile display for a user to interact with the computing device 2100. Display subsystem 2130 includes display interface 2132, which includes the particular screen or hardware device used to provide a display to a user. In one embodiment, display interface 2132 includes logic separate from processor 2110 to perform at least some processing related to the display. In one embodiment, display subsystem 2130 includes a touch screen (or touch pad) device that provides both output and input to a user.

I/O controller 2140 represents hardware devices and software components related to interaction with a user. I/O controller 2140 is operable to manage hardware that is part of audio subsystem 2120 and/or display subsystem 2130. Additionally, I/O controller 2140 illustrates a connection point for additional devices that connect to computing device 2100 through which a user might interact with the system. For example, devices that can be attached to the computing device 2100 might include microphone devices, speaker or stereo systems, video systems or other display devices, keyboard or keypad devices, or other I/O devices for use with specific applications such as card readers or other devices.

As mentioned above, I/O controller 2140 can interact with audio subsystem 2120 and/or display subsystem 2130. For example, input through a microphone or other audio device can provide input or commands for one or more applications or functions of the computing device 2100. Additionally, audio output can be provided instead of, or in addition to display output. In another example, if display subsystem 2130 includes a touch screen, the display device also acts as an input device, which can be at least partially managed by I/O controller 2140. There can also be additional buttons or switches on the computing device 2100 to provide I/O functions managed by I/O controller 2140.

In one embodiment, I/O controller 2140 manages devices such as accelerometers, cameras, light sensors or other environmental sensors, or other hardware that can be included in the computing device 2100. The input can be part of direct user interaction, as well as providing environmental input to the system to influence its operations (such as filtering for noise, adjusting displays for brightness detection, applying a flash for a camera, or other features).

In one embodiment, computing device 2100 includes power management 2150 that manages battery power usage, charging of the battery, and features related to power saving operation. Memory subsystem 2160 includes memory devices for storing information in computing device 2100. Memory can include nonvolatile (state does not change if power to the memory device is interrupted) and/or volatile (state is indeterminate if power to the memory device is interrupted) memory devices. Memory subsystem 2160 can store application data, user data, music, photos, documents, or other data, as well as system data (whether long-term or temporary) related to the execution of the applications and functions of the computing device 2100. In one embodiment, computing device 2100 includes a clock generation subsystem 2152 to generate a clock signal.

Elements of embodiments are also provided as a machine-readable medium (e.g., memory 2160) for storing the computer-executable instructions (e.g., instructions to implement any other processes discussed herein). The machine-readable medium (e.g., memory 2160) may include, but is not limited to, flash memory, optical disks, CD-ROMs, DVD ROMs, RAMs, EPROMs, EEPROMs, magnetic or optical cards, phase change memory (PCM), or other types of machine-readable media suitable for storing electronic or computer-executable instructions. For example, embodiments of the disclosure may be downloaded as a computer program (e.g., BIOS) which may be transferred from a remote computer (e.g., a server) to a requesting computer (e.g., a client) by way of data signals via a communication link (e.g., a modem or network connection).

Connectivity 2170 includes hardware devices (e.g., wireless and/or wired connectors and communication hardware) and software components (e.g., drivers, protocol stacks) to enable the computing device 2100 to communicate with external devices. The computing device 2100 could be separate devices, such as other computing devices, wireless access points or base stations, as well as peripherals such as headsets, printers, or other devices.

Connectivity 2170 can include multiple different types of connectivity. To generalize, the computing device 2100 is illustrated with cellular connectivity 2172 and wireless connectivity 2174. Cellular connectivity 2172 refers generally to cellular network connectivity provided by wireless carriers, such as provided via GSM (global system for mobile communications) or variations or derivatives, CDMA (code division multiple access) or variations or derivatives, TDM (time division multiplexing) or variations or derivatives, or other cellular service standards. Wireless connectivity (or wireless interface) 2174 refers to wireless connectivity that is not cellular, and can include personal area networks (such as Bluetooth, Near Field, etc.), local area networks (such as Wi-Fi), and/or wide area networks (such as WiMax), or other wireless communication.

Peripheral connections 2180 include hardware interfaces and connectors, as well as software components (e.g., drivers, protocol stacks) to make peripheral connections. It will be understood that the computing device 2100 could both be a peripheral device ("to" 2182) to other computing devices, as well as have peripheral devices ("from" 2184) connected to it. The computing device 2100 commonly has a "docking" connector to connect to other computing devices for purposes such as managing (e.g., downloading and/or uploading, changing, synchronizing) content on computing device 2100. Additionally, a docking connector can allow computing device 2100 to connect to certain peripherals that allow the computing device 2100 to control content output, for example, to audiovisual or other systems.

In addition to a proprietary docking connector or other proprietary connection hardware, the computing device 2100 can make peripheral connections 2180 via common or standards-based connectors. Common types can include a Universal Serial Bus (USB) connector (which can include any of a number of different hardware interfaces), DisplayPort including MiniDisplayPort (MDP), High Definition Multimedia Interface (HDMI), Firewire, or other types.

In some embodiments, the computing device 2100 may comprise various components of the device 100 (e.g., the computing device 2100 may implement the device 100). In some embodiments, the display subsystem 2130 of the computing device 2100 may comprise the display panel 146, as discussed with respect to FIG. 1. In some embodiments, various components of the device 100 (e.g., circuitries 106, 110, 142, 126, etc.) may be included in the computing device 2100, and may be used to dynamically control the display resolution of the display panel 146 of the display subsystem 2130. In some embodiments, the sensor 102 may be coupled to the computing device 2100 via the I/O controller 2140. In some embodiments, the storage 122 may be included in the memory subsystem 2160. In some embodiments, the processor 2110 may control operations of one or more of the circuitries discussed with respect to FIG. 1.

Reference in the specification to "an embodiment," "one embodiment," "some embodiments," or "other embodiments" means that a particular feature, structure, or characteristic described in connection with the embodiments is included in at least some embodiments, but not necessarily all embodiments. The various appearances of "an embodiment," "one embodiment," or "some embodiments" are not necessarily all referring to the same embodiments. If the specification states a component, feature, structure, or characteristic "may," "might," or "could" be included, that particular component, feature, structure, or characteristic is not required to be included. If the specification or claim refers to "a" or "an" element, that does not mean there is only one of the elements. If the specification or claims refer to "an additional" element, that does not preclude there being more than one of the additional element.

Furthermore, the particular features, structures, functions, or characteristics may be combined in any suitable manner in one or more embodiments. For example, a first embodiment may be combined with a second embodiment anywhere the particular features, structures, functions, or characteristics associated with the two embodiments are not mutually exclusive While the disclosure has been described in conjunction with specific embodiments thereof, many alternatives, modifications and variations of such embodiments will be apparent to those of ordinary skill in the art in light of the foregoing description. The embodiments of the disclosure are intended to embrace all such alternatives, modifications, and variations as to fall within the broad scope of the appended claims.

In addition, well known power/ground connections to integrated circuit (IC) chips and other components may or may not be shown within the presented figures, for simplicity of illustration and discussion, and so as not to obscure the disclosure. Further, arrangements may be shown in block diagram form in order to avoid obscuring the disclosure, and also in view of the fact that specifics with respect to implementation of such block diagram arrangements are highly dependent upon the platform within which the present disclosure is to be implemented (i.e., such specifics should be well within purview of one skilled in the art). Where specific details (e.g., circuits) are set forth in order to describe example embodiments of the disclosure, it should be apparent to one skilled in the art that the disclosure can be practiced without, or with variation of, these specific details. The description is thus to be regarded as illustrative instead of limiting.

The following examples pertain to further embodiments. Specifics in the examples may be used anywhere in one or more embodiments. All optional features of the apparatus described herein may also be implemented with respect to a method or process.

Example 1

An apparatus comprising: a first circuitry to provide an estimate of a distance of a user from the apparatus; and a second circuitry to: select a display resolution, based at least in part on the estimate of the distance of the user from the apparatus, and cause display of content at the selected display resolution on a display panel of the apparatus Example 2

The apparatus of example 1 or any other example, wherein a content provider is to provide the content at a plurality of display resolutions, and wherein the apparatus further comprises: a third circuitry to request and receive the content from the content provider over a network at the selected display resolution.

Example 3

The apparatus of example 1 or any other example, wherein the display resolution is a first display resolution, and wherein the apparatus further comprises: a third circuitry to receive the content from a content provider over a network at a second display resolution that is different from the first display resolution; a fourth circuitry to scale the content from the second display resolution to the first display resolution; and a fifth circuitry to render the content for display on the display panel at the first display resolution.

Example 4

The apparatus of example 1 or any other example, wherein the display resolution is a first display resolution, and wherein the apparatus further comprises: a third circuitry to access the content that is stored in the apparatus at a second display resolution, the second display resolution being different from the first second display resolution; a fourth circuitry to scale the content from the second display resolution to the first display resolution; and a fifth circuitry to render the content for displaying on the display panel at the first display resolution.

Example 5

The apparatus of any of examples 1-4 or any other example, further comprising: the display panel to display the content at the selected display resolution.

Example 6

The apparatus of any of examples 1-4 or any other example, further comprising: one or more sensors to output, to the first circuitry, data indicative of the distance of the user from the apparatus.

Example 7

The apparatus of example 6 or any other example, wherein the one or more sensors comprise: an Infrared (IR) camera.

Example 8

The apparatus of any of examples 1-4 or any other example, wherein: the first circuitry is to perform image analysis to locate a plurality of users in front of the device; and the first circuitry is to provide the estimate of the distance of the user who is nearest among the plurality of users from the apparatus.

Example 9

The apparatus of any of examples 1-4 or any other example, wherein: the first circuitry is to dynamically update the estimate of the distance of the user from the apparatus; and the second circuitry is to dynamically update the selection of display resolution, based at least on the update of the estimate of the distance of the user from the apparatus.

Example 10

The apparatus of any of examples 1-4 or any other example, wherein the second circuitry is to: select a first display resolution during a first time-period, in response to the estimate of the distance of the user from the apparatus being higher than a threshold distance; and select a second display resolution during a second time-period, in response to the estimate of the distance of the user from the apparatus being lower than the threshold distance.

Example 11

The apparatus of example 10 or any other example, wherein: the first display resolution is lower than the second display resolution.

Example 12

The apparatus of any of examples 1-4 or any other example, wherein the second circuitry is to: divide a scene in front of the apparatus in a plurality of zones; and assign, to at least one zone of the plurality of zones, a corresponding display resolution of a plurality of display resolutions.

Example 13

The apparatus of example 12 or any other example, wherein the second circuitry is to: determine that the user is in a first zone of the plurality of zones, based at least on the estimate of the distance of the user from the apparatus; and select the display resolution of the plurality of display resolutions that is assigned to the first zone.

Example 14

A system comprising: a memory to store content; a graphics processor coupled to the memory, the graphics processor comprising circuitry to select a display resolution to display the content, based at least in part on a scene in front of the system being monitored; a display panel to display the content from the memory at the selected display resolution; and a wireless interface to allow the graphics processor to communicate with another system.

Example 15

The system of example 14 or any other example, wherein the circuitry is a first circuitry, and wherein the system further comprises: one or more sensors to monitor the scene in front of the system; and a second circuitry to analyze the monitored scene, identify one or more users in the scene, and estimate one or more distances at which the one or more users are from the system, wherein the circuitry is to select the display resolution, based at least in part on the one or more distances.

Example 16

The system of example 14 or any other example, wherein the content is first content, wherein the circuitry is a first circuitry, and wherein the system further comprises: a second circuitry to request second content at the selected display resolution from a server over a network, and receive the second content at the selected display resolution from the server over the network; and cause the second content to be displayed on the display panel at the selected display resolution.

Example 17

The system of any of examples 14-16 or any other example, wherein the system comprises one of: a television, a laptop, a tablet, a smart phone, or a cellular phone.

Example 18

Non-transitory computer-readable storage media to store instructions that, when executed by a processor, cause the processor to: receive an estimate of a distance of a user from a display screen; select a display resolution from a plurality of display resolutions, based at least in part on the estimate of the distance of the user from the display screen; and cause the display screen to display content at the selected display resolution.

Example 19

The non-transitory computer-readable storage media of example 18 or any other example, wherein the instructions, when executed, further cause the processor to: request the content at the selected display resolution from a server over a network.

Example 20

The non-transitory computer-readable storage media of any of examples 18-19 or any other example, wherein the selected display resolution is a first display resolution, and wherein the instructions, when executed, further cause the processor to: receive the content at a second display resolution that is different from the first display resolution; and scale the content from the second display resolution to the first display resolution, prior to the content being displayed at the first display resolution on the display screen.

Example 21

A method comprising: receiving an estimate of a distance of a user from a display screen; selecting a display resolution from a plurality of display resolutions, based at least in part on the estimate of the distance of the user from the display screen; and causing the display screen to display content at the selected display resolution.

Example 22

The method of example 21 or any other example, further comprising: requesting the content at the selected display resolution from a server over a network.

Example 23

The method of any of examples 21-22 or any other example, wherein the selected display resolution is a first display resolution, and wherein the method further comprises: receiving the content at a second display resolution that is different from the first display resolution; and scaling the content from the second display resolution to the first display resolution, prior to the content being displayed at the first display resolution on the display screen.

Example 24

An apparatus comprising: means for performing the method of any of the examples 21-23 or any other example.

Example 25

An apparatus comprising: means for receiving an estimate of a distance of a user from a display screen; means for selecting a display resolution from a plurality of display resolutions, based at least in part on the estimate of the distance of the user from the display screen; and means for causing the display screen to display content at the selected display resolution.

Example 26

The apparatus of example 25 or any other example, further comprising: means for requesting the content at the selected display resolution from a server over a network.

Example 27

The apparatus of any of examples 25-26 or any other example, wherein the selected display resolution is a first display resolution, and wherein the apparatus further comprises: means for receiving the content at a second display resolution that is different from the first display resolution; and means for scaling the content from the second display resolution to the first display resolution, prior to the content being displayed at the first display resolution on the display screen.

An abstract is provided that will allow the reader to ascertain the nature and gist of the technical disclosure. The abstract is submitted with the understanding that it will not be used to limit the scope or meaning of the claims. The following claims are hereby incorporated into the detailed description, with each claim standing on its own as a separate embodiment.

We claim:

1. An apparatus comprising:
a display panel;
one or more sensors, wherein the one or more sensors is to output data indicative of an estimation of a distance of a user from the apparatus;
a circuitry coupled to the display panel, wherein the circuitry is to:
select a display resolution of the display panel, based at least in part on the estimate of the distance of the user from the apparatus, and
cause display of content at a resolution different from a requested display resolution on the display panel,
wherein the circuitry is to consider factors prior to cause the display of content at a resolution different from the request display resolution,
wherein the factors include: bandwidth available between the apparatus and a server, a Quality of Service (QoS) agreement between the apparatus and the server, and load on the server, and
wherein the server is to provide the content for display on the display panel.

2. The apparatus of claim 1, wherein the circuitry is a first circuitry, wherein a content provider is to provide the content at a plurality of display resolutions, and wherein the apparatus further comprises:

a second circuitry to request and receive the content from the content provider over a network at the selected display resolution.

3. The apparatus of claim 1, wherein the circuitry is a first circuitry, wherein the display resolution is a first display resolution, and wherein the apparatus further comprises:
a second circuitry to receive the content from a content provider over a network at a second display resolution that is different from the first display resolution;
a third circuitry to scale the content from the second display resolution to the first display resolution; and
a fourth circuitry to render the content for display on the display panel at the first display resolution.

4. The apparatus of claim 1, wherein the circuitry is a first circuitry, wherein the display resolution is a first display resolution, and wherein the apparatus further comprises:
a second circuitry to access the content that is stored in the apparatus at a second display resolution, the second display resolution being different from the first second display resolution;
a third circuitry to scale the content from the second display resolution to the first display resolution; and
a fourth circuitry to render the content for displaying on the display panel at the first display resolution.

5. The apparatus of claim 1, wherein the one or more sensors comprise:
an Infrared (IR) camera.

6. The apparatus of claim 1, wherein:
the circuitry is to perform image analysis to locate a plurality of users in front of the device; and
the circuitry is to provide the estimate of the distance of the user who is nearest among the plurality of users from the apparatus.

7. The apparatus of claim 1, comprises one or more logic to:
dynamically update the estimate of the distance of the user from the apparatus; and
dynamically update the selection of display resolution, based at least on the update of the estimate of the distance of the user from the apparatus.

8. The apparatus of claim 1, comprises one or more logic to:
select a first display resolution during a first time-period, in response to the estimate of the distance of the user from the apparatus being higher than a threshold distance; and
select a second display resolution during a second time-period, in response to the estimate of the distance of the user from the apparatus being lower than the threshold distance.

9. The apparatus of claim 8, wherein:
the first display resolution is lower than the second display resolution.

10. The apparatus of claim 1, wherein the second circuitry is to:
divide a scene in front of the apparatus in a plurality of zones; and
assign, to at least one zone of the plurality of zones, a corresponding display resolution of a plurality of display resolutions.

11. The apparatus of claim 10, comprises one or more logic to:
determine that the user is in a first zone of the plurality of zones, based at least on the estimate of the distance of the user from the apparatus; and
select the display resolution of the plurality of display resolutions that is assigned to the first zone.

12. A system comprising:
a memory to store content;
a graphics processor coupled to the memory, the graphics processor comprising circuitry to select a display resolution of a display panel to display the content, based at least in part on a scene in front of the system being monitored;
the display panel to display the content from the memory at a resolution different from a requested display resolution; and
a wireless interface to allow the graphics processor to communicate with another system,
wherein the graphics processor is to consider factors prior to cause the display of content at a resolution different from the request display resolution,
wherein the factors include: bandwidth available between the apparatus and a server, a Quality of Service (QoS) agreement between the apparatus and the server, and load on the server, and
wherein the server is to provide the content for display on the display panel.

13. The system of claim 12, wherein the circuitry is a first circuitry, and wherein the system further comprises:
one or more sensors to monitor the scene in front of the system; and
a second circuitry to analyze the monitored scene, identify one or more users in the scene, and estimate one or more distances at which the one or more users are from the system,
wherein the first circuitry is to select the display resolution, based at least in part on the one or more distances.

14. The system of claim 12, wherein the content is first content, wherein the circuitry is a first circuitry, and wherein the system further comprises:
a second circuitry to request second content at the selected display resolution from a server over a network, and receive the second content at the selected display resolution from the server over the network; and
a third circuitry to cause the second content to be displayed on the display panel at the selected display resolution.

15. The system of claim 12, wherein the system comprises one of: a television, a laptop, a tablet, a smart phone, or a cellular phone.

16. Non-transitory computer-readable storage media to store instructions that, when executed by a processor, cause the processor to:
receive an estimate of a distance of a user from a display screen;
select a display resolution of the display screen from a plurality of display resolutions, based at least in part on the estimate of the distance of the user from the display screen; and
cause the display screen to display content at a resolution different from a requested display resolution,
consider factors prior to cause the display of content at a resolution different from the request display resolution, wherein the factors include: bandwidth available between the apparatus and a server, a Quality of Service (QoS) agreement between an apparatus and the server, and load on the server, wherein the apparatus includes the processor, and wherein the server is to provide the content for display on the display screen.

17. The non-transitory computer-readable storage media of claim 16, wherein the instructions, when executed, further cause the processor to:

request the content at the selected display resolution from a server over a network.

18. The non-transitory computer-readable storage media of claim 16, wherein the selected display resolution is a first display resolution, and wherein the instructions, when executed, further cause the processor to:
   receive the content at a second display resolution that is different from the first display resolution; and
   scale the content from the second display resolution to the first display resolution, prior to the content being displayed at the first display resolution on the display screen.

19. An apparatus comprising:
   a display screen to display content at a resolution different from a requested display resolution; and
   circuitry to consider factors prior to cause the display of content at a resolution different from the request display resolution, wherein the factors include:
      bandwidth available between the apparatus and a server,
      a Quality of Service (QoS) agreement between the apparatus and the server, and
      load on the server,
      wherein the server is to provide the content for display on the display screen.

20. The apparatus of claim 19, wherein the display screen is part of one of: a laptop, a tablet, a smart phone, or a cellular phone.

21. The apparatus of claim 19 comprises:
   a first camera adjacent to the display screen; and
   a second camera including IR circuitry, wherein the second camera is integrated in the first camera.

* * * * *